(12) United States Patent
Heizmann et al.

(10) Patent No.: US 6,998,813 B2
(45) Date of Patent: Feb. 14, 2006

(54) DEVICE FOR GENERATION OF A SIGNAL DEPENDENT ON ROTATIONAL SPEED FOR AN ELECTRIC MOTOR, IN PARTICULAR FOR AN ELECTRONICALLY-COMMUTATED DC MOTOR

(75) Inventors: Joachim Heizmann, Immendingen (DE); Markus Kloepzig, Spaichingen (DE); Hans-Joachim Wysk, Villingen-Schwenningen (DE)

(73) Assignee: Minebea Co., Ltd., Nagano-ken (JP)

( * ) Notice: Subject to any disclaimer, the term of this patent is extended or adjusted under 35 U.S.C. 154(b) by 13 days.

(21) Appl. No.: 10/478,858

(22) PCT Filed: Apr. 25, 2002

(86) PCT No.: PCT/EP02/04604

§ 371 (c)(1),
(2), (4) Date: Jun. 8, 2004

(87) PCT Pub. No.: WO03/001216

PCT Pub. Date: Jan. 3, 2003

(65) Prior Publication Data

US 2004/0232873 A1    Nov. 25, 2004

(30) Foreign Application Priority Data

Jun. 22, 2001  (DE)  ................................ 101 30 130

(51) Int. Cl.
*H02K 21/24*  (2006.01)

(52) U.S. Cl. ...................... 318/653; 318/254; 318/463; 318/696; 341/178

(58) Field of Classification Search ................ 318/653, 318/463, 268, 254, 696, 800; 341/176; 324/166, 324/161, 76.11; 388/811; 340/453; 73/488
See application file for complete search history.

(56) References Cited

U.S. PATENT DOCUMENTS 3,988,024 A    10/1976  Watanabe et al.

(Continued)

FOREIGN PATENT DOCUMENTS

| DE | 42 16 142 | 11/1993 |
|---|---|---|
| DE | 199 54 115 | 4/2001 |
| GB | 1132949 | 11/1968 |

OTHER PUBLICATIONS

DE 199 54 115 and DE 42 16 142. The listed documents are examples of sensing devices for rotors. A corresponding English abstract has been provided for each document.

*Primary Examiner*—Paul Ip
(74) *Attorney, Agent, or Firm*—Duane Morris LLP (57) ABSTRACT

The invention provides a device to generate an rpm-dependent signal, or a tachogenerator, having a plurality of magnet elements with alternating polarity which are arranged and distributed around the circumference of the rotor shaft. The magnet elements preferably take the form of a magnetic ring which has alternatively polarized sections and is held on a support attached to the rotor shaft. The tachogenerator of the present invention has at least one coil parallel to the axis which is arranged on a second supporting device at an axial distance to the magnet elements. The magnets and coils are arranged spatially relative to each other and can be rotated in relation to each other with the rotation of the rotor shaft in order to induce an rpm-dependent signal in the coils. In accordance with the invention, a signal displacement device is provided which superimposes a DC voltage on the signals induced in the coils in order to generate a voltage-displaced signal. This DC voltage is preferably a positive DC voltage in order to raise the rpm-dependent signal to a positive voltage level.

29 Claims, 6 Drawing Sheets

U.S. PATENT DOCUMENTS

| | | | |
|---|---|---|---|
| 4,109,234 A * | 8/1978 | Davis | 340/453 |
| 4,240,014 A * | 12/1980 | Muller | 388/811 |
| 4,291,268 A * | 9/1981 | Okuyama | 324/76.11 |
| 4,364,005 A | 12/1982 | Kohzai et al. | |
| 4,437,061 A | 3/1984 | Shinozaki et al. | |
| 4,459,533 A * | 7/1984 | Ehret et al. | 318/800 |
| 4,578,606 A | 3/1986 | Welterlin | |
| 4,629,948 A | 12/1986 | Tassinario | |
| 4,683,409 A * | 7/1987 | Boillat | 318/696 |
| 4,847,555 A * | 7/1989 | Stammer et al. | 324/161 |
| 4,972,095 A | 11/1990 | Oka et al. | |
| 4,983,915 A | 1/1991 | Rossi | |
| 5,032,773 A * | 7/1991 | Frank | 318/254 |
| 5,278,773 A * | 1/1994 | Cousineau | 700/287 |
| 5,349,276 A * | 9/1994 | Mezzatesta et al. | 318/268 |
| 5,369,344 A * | 11/1994 | Mezzatesta et al. | 318/463 |
| 5,451,867 A | 9/1995 | Loreck et al. | |
| 5,796,232 A | 8/1998 | Alberter et al. | |
| 6,109,102 A * | 8/2000 | Schneider | 73/488 |
| 6,492,804 B1 * | 12/2002 | Tsuge et al. | 324/166 |
| 6,653,968 B1 * | 11/2003 | Schneider | 341/178 |

* cited by examiner

DEVICE FOR GENERATION OF A SIGNAL DEPENDENT ON ROTATIONAL SPEED FOR AN ELECTRIC MOTOR, IN PARTICULAR FOR AN ELECTRONICALLY-COMMUTATED DC MOTOR

The instant disclosure claims the filing date benefit of German Application No. 10130130.8, filed Jun. 22, 2001, and PCT Application No. PCT/EP 02/04604 Filed Apr. 25, 2002.

The invention relates to a device to generate an rpm-dependent signal for an electric motor, particularly for an electronically commutated DC motor. Electric motors have a device to generate an rpm-dependent signal which is also referred to as a tachogenerator which generates a signal used in the control of motor speed.

The invention relates in general to brushless DC motors or electronically commutated DC motors and associated speed-control systems which are used, for example, in the automobile sector for steering systems and for other applications. DC motors which are used in steering systems are expected to generate a high output with low torque ripple and low detent torque. Since the DC motor is positioned in the vicinity of the motor vehicle's internal combustion engine, it has to be able to withstand extreme temperatures, moisture, dirt and other environmental factors. Moreover, automobile manufacturers generally demand low resistance and tight resistance tolerances as well as low inductivity of the overall arrangement.

Electronically commutated DC motors generally include a permanent magnet which is attached to a rotor shaft and has several circumferential alternating poles, as well as a stator which has several drive windings that interact with the magnetic poles of the rotor.

U.S. Pat. No. 4,578,606 describes an electric motor in conjunction with a tachogenerator in which a tachogenerator coil is arranged in the rotor magnet's field so that when the motor rotates, a voltage is induced in the tachogenerator coil by the magnetic poles. In the electric motor described in this application, the permanent magnet attached to the rotor shaft is divided into two concentric sections, whereby an outer section of the permanent magnet features eight magnetic poles in interaction with the motor (stator) coils and a smaller inner section or inner circumference of the permanent magnet which features 26–50 poles that interact with the tacho coil which is wound in the circumferential direction of the motor in order to generate an rpm-dependent signal. The frequency of the signal generated in the tachogenerator coil corresponds to the speed of the rotor shaft. The electric motor described in U.S. Pat. No. 4,578,606 is particularly used in computer disk drives. Particular requirements concerning the strength of the signal generated by the tachogenerator or its resistance to environmental influences are not discussed in this document.

The underlying object of the invention is to provide a device to generate an rpm-dependent signal for an electric motor and an associated method which can generate a strong tachogenerator signal and which are resistant to such environmental influences as high temperatures, moisture etc.

This object has been achieved by a device having the characteristics outlined in claim 1 and by a method having the procedural steps described in claim 26. The invention also provides an electric motor which includes such a device.

The invention provides a device to generate an rpm-dependent signal, or a tachogenerator, having one or more permanent magnets of alternating polarity which are arranged and distributed around the circumference of the rotor shaft. As in U.S. Pat. No. 4,578,606, these magnet elements can be magnetized segments of the rotor magnet with alternating polarity. The magnet elements preferably take the form of a magnetic ring which has alternatively polarized sections and is held on a support attached to the rotor shaft and revolves with the shaft. The tachogenerator of the present invention has at least one "detection" coil parallel to the axis which is arranged on a second supporting device firmly fixed to the housing at an axial distance to its associated magnet elements. A plurality of detection coils are preferably provided, arranged and equally distributed around the circumference of the rotor shaft and parallel to the axis, whereby in the preferred embodiment of the invention, each coil is arranged alongside and parallel to the rotor shaft. The magnets and coils are arranged spatially relative to each other, whereby the magnet poles located on and revolving with the rotor have a motion relative to the coils firmly fixed to the housing.

An rpm-dependent signal in the form of a regular alternating current is induced in the coils by the rotation of the rotor shaft, whereby in accordance with the invention, the maximum amplitude or the difference in amplitude of the signal voltage induced in the detection coil is registered and interpreted as a measuring quantity for the speed.

In accordance with the invention, a circuit arrangement is provided in which the reference potential for the signal voltage induced in the coil is displaced in that a (preferably stabilized) DC voltage is superimposed on the almost trapezoid signal voltage. The superimposing voltage is preferably a positive DC voltage so that a positive pulsating DC voltage is produced as the rpm-dependent signal.

The tachogenerator arrangement of the present invention according to claim 1, in conjunction with coils having an adequate number of turns, makes it possible to obtain an rpm-dependent signal with a sufficiently strong signal which can be transmitted to a "conventional" analogue/digital transducer without the interposition of operational amplifiers or suchlike, whereby it is sufficient if the analogue/digital transducer operates in a normal, positive voltage range of 0 to 5 V or 0 to 3 V, for example.

In accordance with the invention, the circuit arrangement for displacing or raising the signal is achieved using a simple voltage divider which is connected on one side to the coil emitting the signal and on the other side to a voltage supply of 5 V, for example. The signal induced in the coil displaced by a DC voltage is now produced in the center tap of the voltage divider.

In a preferred embodiment, the voltage divider has two resistors connected in series whose connecting point forms the center tap of the voltage divider. It is assumed that a detection coil connected between the voltage divider and the reference potential, for example, a ground, generates an output signal of between −4 V and +4 V. Moreover, it is assumed that the supply voltage is 5 V and the voltage divider has two ohmic resistors of the same magnitude. The signal induced in the detection coil raised by 2.5 V and halved in amount i.e. a signal varying between 0.5 and 4.5 V, is now produced in the center tap of the voltage divider. This voltage-displaced signal can be directly processed by an analogue/digital transducer with an operational voltage range from 0 to 5 V without further requirements.

The circuit arrangement is preferably provided with an interference filter which, for example, can take the form of a capacitor between the center tap and the reference potential.

In a preferred embodiment of the invention, at least two, particularly four or six, coils are provided which are arranged and equally distributed around the circumference of the shaft. To generate a stronger signal, preferably two or three coils are connected in series and allocated to a circuit arrangement for displacing or raising the signal. Either a circuit arrangement to displace the signals of all the coils can be provided, whereby the coils are then alternatively connected via a multiplexer to the circuit arrangement for signal displacement, or each coil or set of coils connected in series is allocated to its own, separate circuit arrangement for signal displacement.

In the preferred embodiment of the invention, the coils are wound so as to generate the highest possible output signal. For this purpose, an appropriate compromise between the required high signal strength and the form of the signal has to be found. Since the device is intended for use in automobile technology, such factors as the mechanical strength of the coils and the soldering technique to be used have to be taken into account in realizing the coils.

In particular, the coils could be wound with a thin flat wire set on edge and preferably with a thin round or flat wire, coated with an insulating material, particularly an enameled wire. Enameled wire has the advantage of already being coated with an insulating material, whereby the coil is heated after winding and bonded into a solid body. The insulating material can be easily removed from the winding ends in order to connect the finished coil.

The coils of the present invention can be air-core coils or coils wound onto a coil core. They preferably have at least 150 turns. Each coil is moreover preferably provided with a magnetic reflux element.

In the preferred embodiment of the invention, the coil supporting member is a rigid or flexible PCB which is positioned opposite the magnet elements. The magnet elements take the form of a magnetic ring which has alternating polarized sections, in particular 4 to 12, preferably 6 or 8, alternating polarized sections.

In a particularly preferred embodiment, the coils take the form of flat coils whose circumferential contour is adapted to the shape of the magnetic ring sections. In this respect, the coils have a similar design to the drive coils (30) shown in U.S. Pat. No. 4,578,606, whereby it should be noted that the drive coils in the U.S. patent are not used to register the speed but rather to drive the motor.

The inventors, however, have discovered that the flat drive coils used in spindle motors for hard or floppy disk drives are particularly well suited for use as detection coils in a tachogenerator for its intended application in an electric motor for the automobile sector since the coils are particularly flat and compact and have high mechanical accuracy and mechanical strength.

The adaptation of the circumferential contour of the flat coils to the shape of the magnetic ring sections, having as large an inner opening as possible, is suitable for inducing an rpm-dependent signal in the coils which comes closest to the ideal trapezoid waveform required.

As mentioned above, several coils are preferably arranged and distributed around the rotor shaft, whereby two or three coils or sets of coils connected in series are preferably provided which, for example, generate signals with phases displaced by 90° (electric). To interpret the coil signals, the invention preferably provides an analysis and control device having a sensor to determine the rotational position of the rotor shaft and, depending on this position, to decide which half-wave of the rpm-dependent signal of which coil is analyzed to determine the speed. As a result, it is almost always possible to analyze a level section of one of the coil signals.

The invention is described in more detail below on the basis of preferred embodiments with reference to the drawings. The figures show.

Figure 1:
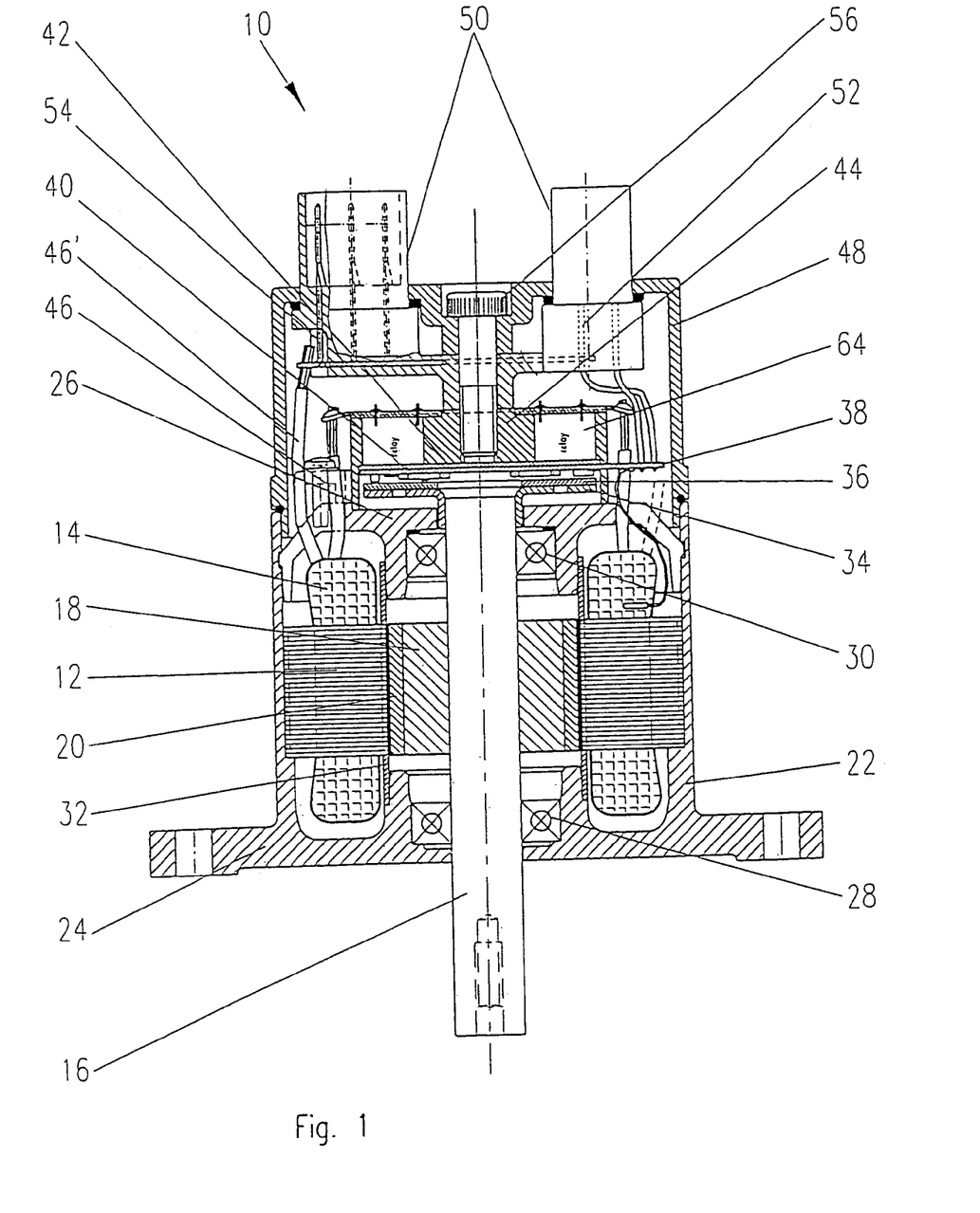
FIG. 1 a cross-sectional view through an electric motor with a tachogenerator in accordance with the present invention.

FIG. 1 shows a cross-sectional view of an electronically commutated DC motor in accordance with the present invention which can find particular application in the automobile sector and is used there, for example, in steering systems. The DC motor which is generally indicated by 10 has a stator with a stator stack 12 and stator windings 14. Within the stator, there is a rotor having a rotor shaft 16, a coil flux guide 18 which is positioned on the rotor shaft 16, and a permanent magnet 20, which is segmented or formed as a ring.

Stator and rotor are enclosed by a housing 22 which has a flange 24 or 26 at each of its ends, whereby the rotor shaft 16 protrudes from the end towards flange 24 and the signal lines and winding connections of the motor are lead out of the end towards flange 26.

The rotor shaft 16 is rotatably supported in the flanges 24 and 26 by means of bearings 28 and 30, for example, roller or journal bearings, in particular ball bearings.

In the embodiment illustrated, the rotor assembly 16, 18, 20 is additionally enclosed by a sleeve 32 which, together with the flanges 24 and 26, encloses the rotor assembly and prevents foreign bodies from penetrating into the rotor assembly.

A DC motor which has a similar construction to the DC motor illustrated in FIG. 1, is described in more detail in German patent applications 100 34 302.3 and 100 51 403.0, to which reference is made. We would like to emphasize that the tachogenerator of the present invention can be used in conjunction with any other known or still to be developed type of DC motor. The embodiment illustrated in FIG. 1 is simply used by way of example.

A holding device is mounted on the rotor shaft 16 of the DC motor illustrated in FIG. 1, on which a magnetic ring 36 is attached which will be described in more detail below. A supporting member taking the form of a PCB 38 is arranged opposite and parallel to the holding device 34 and the magnetic ring 36, with coils 40 being placed on the side facing the magnetic ring 36, which will also be described in more detail below. On the other side of the PCB 38, facing away from the magnetic ring 36, there is a coil flux guide component 42.

As can be seen from FIG. 1, the holding device 34 and the ring magnet 36 arranged on it rotate together with the rotor shaft 16, while the PCB 38 with the coils 40 arranged on it remain stationary, so that when the rotor shaft 16 rotates a relative movement is created between the ring magnets 36 and the coils 40.

A relay support 44 is also shown in FIG. 1 with mounted relays which are connected to the ends 46 of the stator windings 14 in order to connect or interrupt the motor power supply lines.

The DC motor illustrated in FIG. 1 is sealed with a housing cover 48 which features integrated socket/plug components 50 which are connected to signal lines 52 or the winding ends 46 via a connecting piece 54.

The PCB 38, relay support 44 and the housing cover 48 are held in position by means of a center screw 56, suitable snap fasteners and/or by bonding.

As explained earlier, the tachogenerator of the present invention can also be used in other types of DC motors, whereby the design of the housing and the flanges as well as the arrangement and routing of the various electrical components can be devised in any way known to the person skilled in the art.

Figure 2:
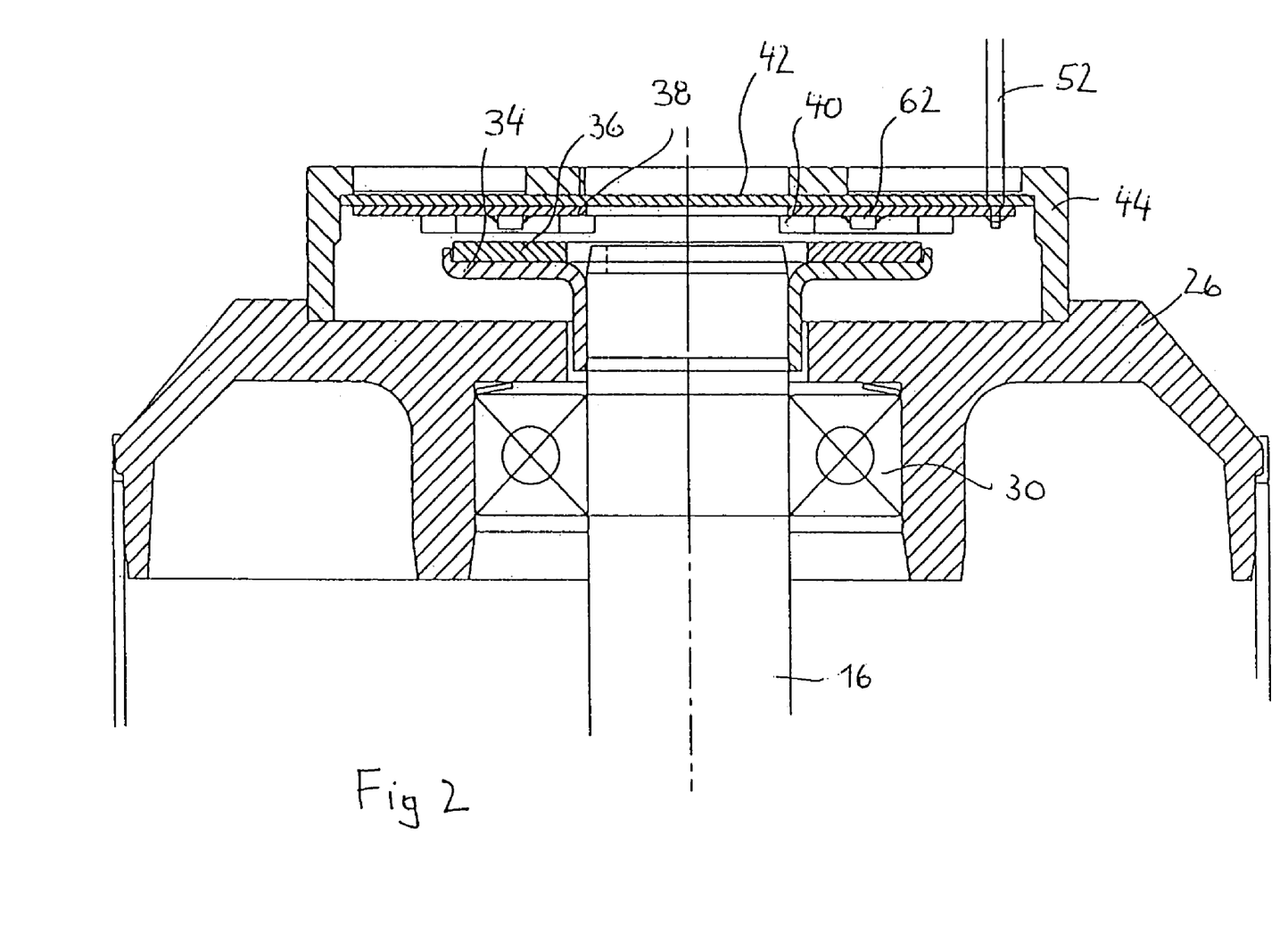
FIG. 2 a cross-sectional view through a tachogenerator in accordance with the present invention.

FIG. 2 shows a cross-sectional view through the tachogenerator in accordance with the present invention in further detail.

In FIG. 2, the flange 26 with the bearings 30 and the shaft 16 supported by them are shown. The holding device 34 of the tachogenerator is located on the shaft 16 and holds the magnetic ring 36 which is immovably connected to the shaft 16 and revolves with it. The supporting member (sensor PCB) 38, located opposite the magnetic ring 36, is held in a section of the relay support 44 at a fixed axial distance from and parallel to the magnetic ring 36. The person skilled in the art will be able to conceive other means of supporting the sensor PCB 48, fixed in relation to the housing of the DC motor 10 and aligned towards the magnetic ring 36.

Coils 40 are arranged on the sensor PCB 38, parallel to the axis of the shaft 16 of the motor and equally distributed around the rotational axis of the shaft 16 which are used as detection coils to register the speed of the shaft 16. A Hall sensor 62 to determine the rotational position of the shaft 16 is arranged within each coil, whereby the person skilled in the art will be aware that a different number of Hall sensors and a different means of determining the rotational position could be chosen, for example, using inductive, optical or capacitive sensors.

The coil flux guide 42 to close the magnetic field is provided on the side of the sensor PCB 38 facing away from the magnetic ring 36. In another embodiment, the coil flux guide can be used at the same time as a support for the sensor electronics so that a separate PCB need not be provided.

Figure 3:
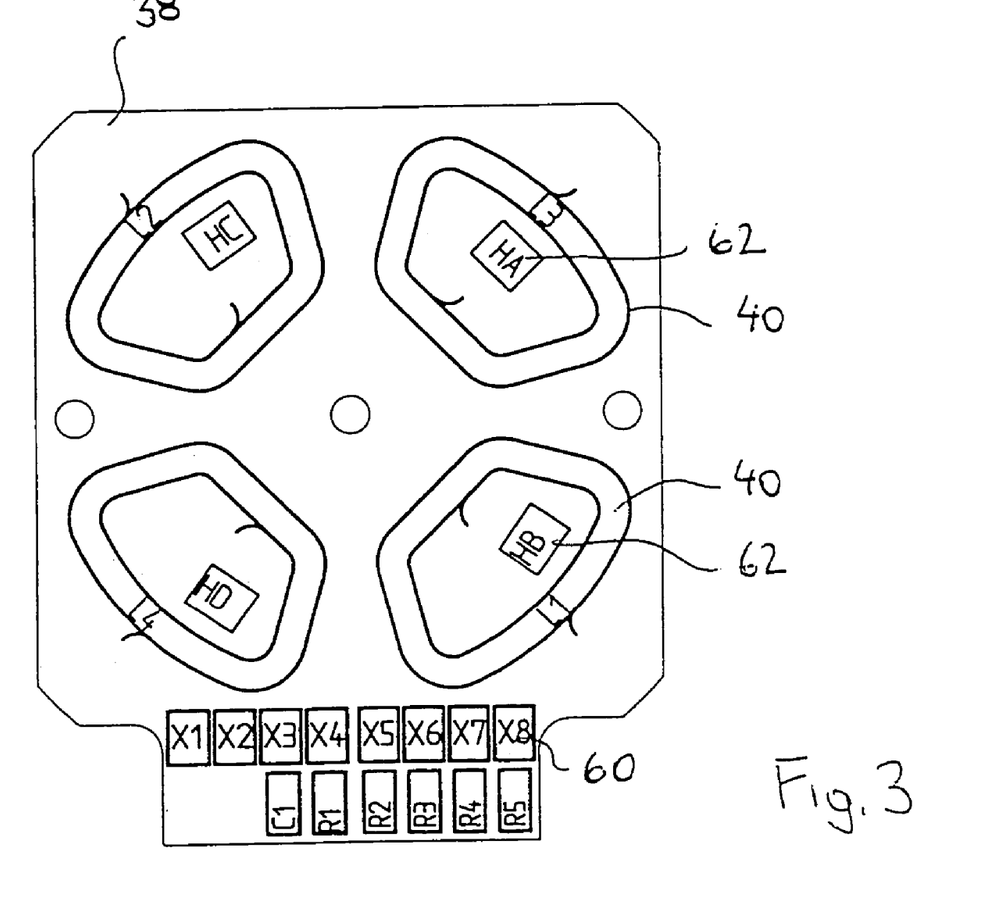
FIG. 3 a view from above of a supporting member, on which four coils are arranged, for a tachogenerator in accordance with the present invention.

FIG. 3 shows a view from above of the supporting member 38 of the tachogenerator presented in the invention with four mounted sensor coils 40. This supporting member 38 is executed in particular as a printed circuit board, whereby contacts 60 are provided on one side of the PCB which are used to connect the signal lines 52 as well as the supply lines to the coils 40 and other electronic components on the PCB 38. The supporting member can also be made out of a flexible circuit board material (flex-circuit) or any other suitable substrate to which coils can be attached.

In the preferred embodiment of the invention, however, a single-layered PCB 38 is used with the coils 40 being arranged on the side facing the magnetic ring 36 and the coil flux guide component 42 (not shown in FIG. 3) being arranged on the other side facing away from the magnetic ring.

In the preferred embodiment of the invention, four coils 40 are provided, arranged evenly around the circumference of the rotor shaft 16 and wound parallel to its axis, whereby two of the coils 40 are connected in series so that two rpm-dependent signals are generated, as described below.

The coils can be formed from a very thin flat wire wound on-edge and designed in the same way as the ones used as drive coils in spindle motors in hard disk drives. In the preferred embodiment, the coils are wound using a thin round or flat wire coated with an insulating material, a so-called enameled wire. Using this wire allows the maximum number of turns to be realized within a smaller coil height and reduced space requirement, whereby each coil has a minimum of 150 turns in order to generate the highest possible output signal. Using enameled wire has the further advantage that by simply heating the wound coil the insulating material surrounding the wire can be melted so that a compact, stable coil ring is produced which is easy to handle and to mount without the need to use coil cores. The insulating material can be easily removed from the winding ends to connect the coils 40.

Figure 4A:
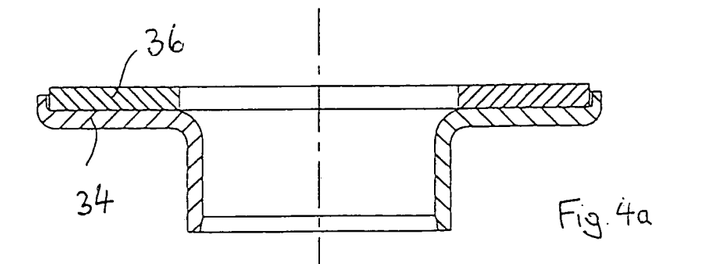
FIGS. 4a and 4b a sectioned side view and view from above of a ring magnet with six magnet elements of a tachogenerator in accordance with the present invention.
Figure 4B:
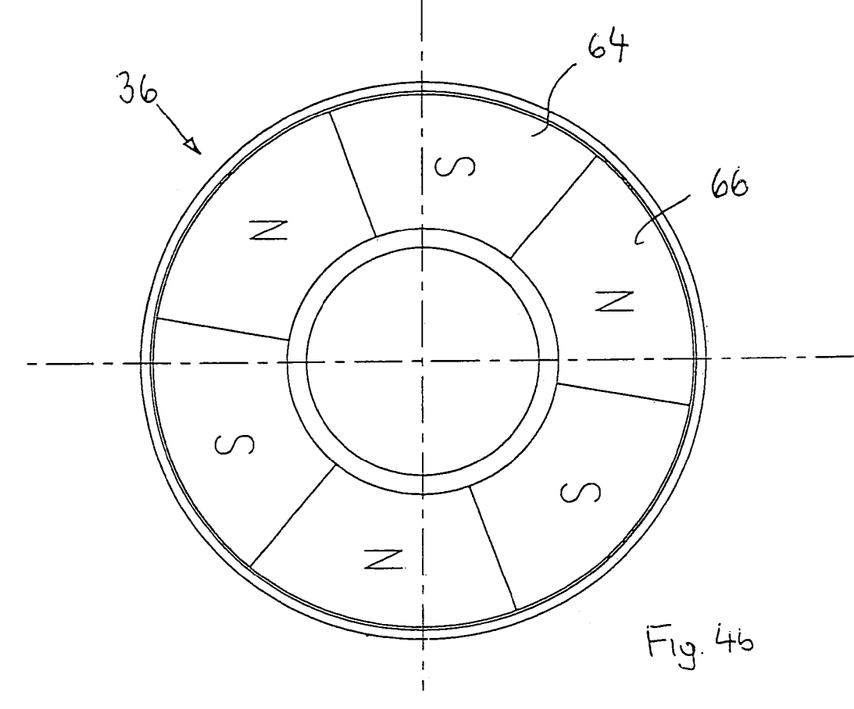

The outer contour of the flat coils 40 is essentially adapted to the shape of the alternating polarized sections of the opposing ring magnet 42, as can be seen in comparing FIGS. 3 and 4. The adaptation of the coil shape to the shape of the magnet segments and the provision of as wide a coil opening as possible is used to generated trapezoid coil signals which have a level section as well as the steepest possible sides, which is still to be explained in detail below in reference to FIG. 6.

Other components can be arranged on the PCB 38, such as Hall sensors 62 to generate a rotational position signal or resistors and capacitors (not shown) to produce the circuit arrangement of the invention which is explained in more detail in reference to FIG. 4.

The PCB 38 with the mounted coils 40 is arranged opposite the holding device 34 for the ring magnets 36, as shown in FIGS. 1 and 2. FIG. 4 shows a view from above of the holding device 34, which can take the form of a disc pressed onto the rotor shaft 16. The holding device 34 supports at least one magnetic ring 36, which has alternating polarized, evenly distributed segments or magnet elements 64, 66. In the embodiment illustrated, the magnetic ring 36 has six (6) alternating polarized magnet elements 64, 66, whereby other embodiments can have a different number of magnetic poles, particularly eight (8), for example.

If the tachogenerator of the invention has more than one coil 40 or one coil pair connected in series, an important aspect of the invention is based on the correct relation between the coils 40 and the alternating magnetized sections of the magnetic ring 36. In particular, the coils 40 should be arranged in such a way relative to the magnetic ring 36 that in a specified relative position one of the coils 40 fully covers the segment 64 or 66 of the ring magnet 36 while the neighboring coil 40 lies at a transition point between alternating polarized segments 64, 66. This allows the several coils or the coil pairs connected in series to generate phase-shifted signals, whereby, in a preferred embodiment of the invention, a phase-shift of 90° (electric) is chosen although other phase-shifts can also be obtained.

Figure 5:
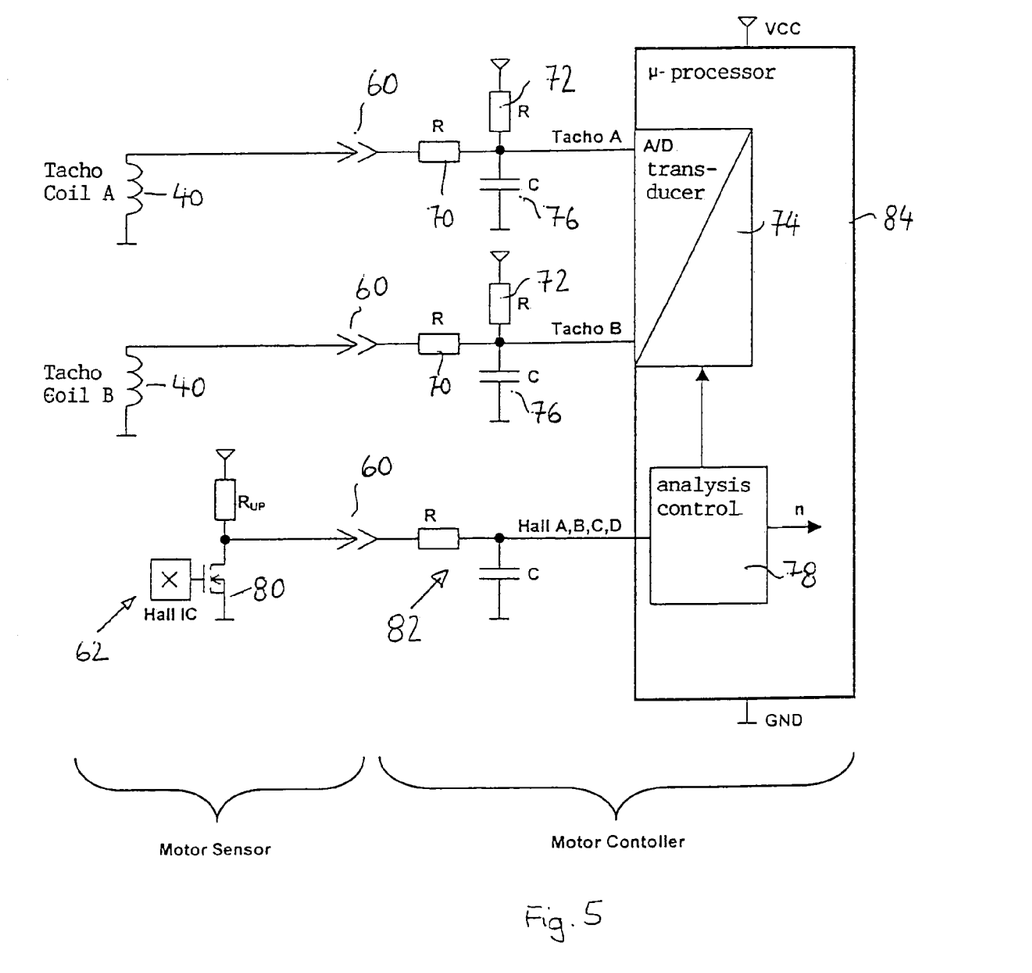
FIG. 5 a simplified circuit diagram of the circuit arrangement of the tachogenerator in accordance with the present invention.

FIG. 5 shows a simplified circuit diagram of a circuit arrangement for a tachogenerator in accordance with the present invention, whereby the case illustrated in FIG. 5 is that of the signal being analyzed by two detection coils 40.

FIG. 5 shows a circuit arrangement in accordance with the present invention to raise the signal of the signals supplied by the detection coils 40.

On the left-hand side of FIG. 5, the sensors specified for the DC motor are shown, namely two coils A and B, each of which are formed from two coils 40 connected in series, and one of the four Hall sensors 62, which are arranged on the PCB 38 as shown in FIG. 3. The three other Hall sensors are not shown in FIG. 5 for the sake of simplicity but are nonetheless connected to the analysis and control device 78 via corresponding circuit arrangements.

The detection coils A and B, 40, supply rpm-dependent, essentially trapezoid alternating signals whose amplitude or difference in amplitude is interpreted to register the speed of the DC motor.

In a preferred embodiment, the Hall sensor 62 takes the form of a Hall-IC with a Hall sensor board 62 and an output amplifier 80, for example, a MOSFET amplifier. It generates a digital output signal which is a reflection of the north/south poles of the rotating ring magnet 36 in the form of a step function. The output signals of the Hall sensors 62 are transmitted to the analysis and control device 78 via the contacts 60 and a filter circuit 82.

As explained in more detail below with reference to FIG. 6, the relative position of the rotor shaft 16 can be derived from the Hall sensor output signals. To determine the relative position at the required resolution, several Hall sensors are arranged staggered by 90 or 120 degrees (electric).

Each Coil A and B, 40, is assigned a voltage divider consisting of two resistors 70, 72 and a filter capacitor 76. The output signals of the voltage dividers are applied to an analogue/digital transducer 74 which is coupled to an analysis and control device 78. The analogue/digital transducer 74 and the analysis and control device 78 can be integrated in a microprocessor 84.

The voltage divider resistors 70, 72 are connected between a voltage supply Vcc of 5 V, for example, and the detection coil 40, whereby the coil is connected at its other end with a reference potential, for example, a ground. Through the relative rotation between the coil 40 and the ring magnet 36, an alternating voltage is induced in the coil 40 which oscillates between a value of $+V_{L\_max}$ and $-V_{L\_max}$. Both the frequency as well as the amplitude of the voltage induced in the coil 40 are proportional to the speed of the rotor shaft 16, whereby in the tachogenerator of the present invention, the amplitudes $+V_{L\_max}$; $-V_{L\_max}$, or the difference in amplitude is interpreted.

In using wound coils with an adequate number of turns, a signal is generated in the coils 40 having a sufficiently high amplitude and current which can be processed by an analogue/digital transducer 74 without the need to interpose another amplifier element such as an operational amplifier. Not having to use sensitive components such as operational amplifiers is advantageous particularly for the intended application of the DC motor presented in the invention in the automobile sector.

In interpreting the voltage induced in the coil 40, the problem arises that the voltage signal induced in the coil 40 is an alternating voltage with, for example, an amplitude of +/−4 V which cannot be interpreted by a conventional analogue/digital transducer.

The invention thus proposes a circuit arrangement in the form of a voltage divider 70, 72 which halves the signal induced in the coil 40 and superimposes a DC voltage on it which corresponds to half the voltage supply Vcc. Consequently, at the connecting point between the resistors 70, 72, a voltage is produced which corresponds to half the voltage induced in the coil 40 which is raised by ½ Vcc.

In a preferred embodiment, the voltage supply Vcc is +5 V, for example, so that the voltage induced in the coil 40 has a DC voltage of +2.5 V superimposed on it. This means that a signal proportional to the rpm is applied at the input of the analogue/digital transducer 74 which varies in a range of from +0.5 V to +4.5 V.

The circuit arrangement shown in FIG. 5 additionally provides the capacitor 76 to suppress interference in the voltage-raised signal induced in the coil 40. Instead of the capacitor 76, the person skilled in the art can use any other suitable interference filter.

Figure 6:
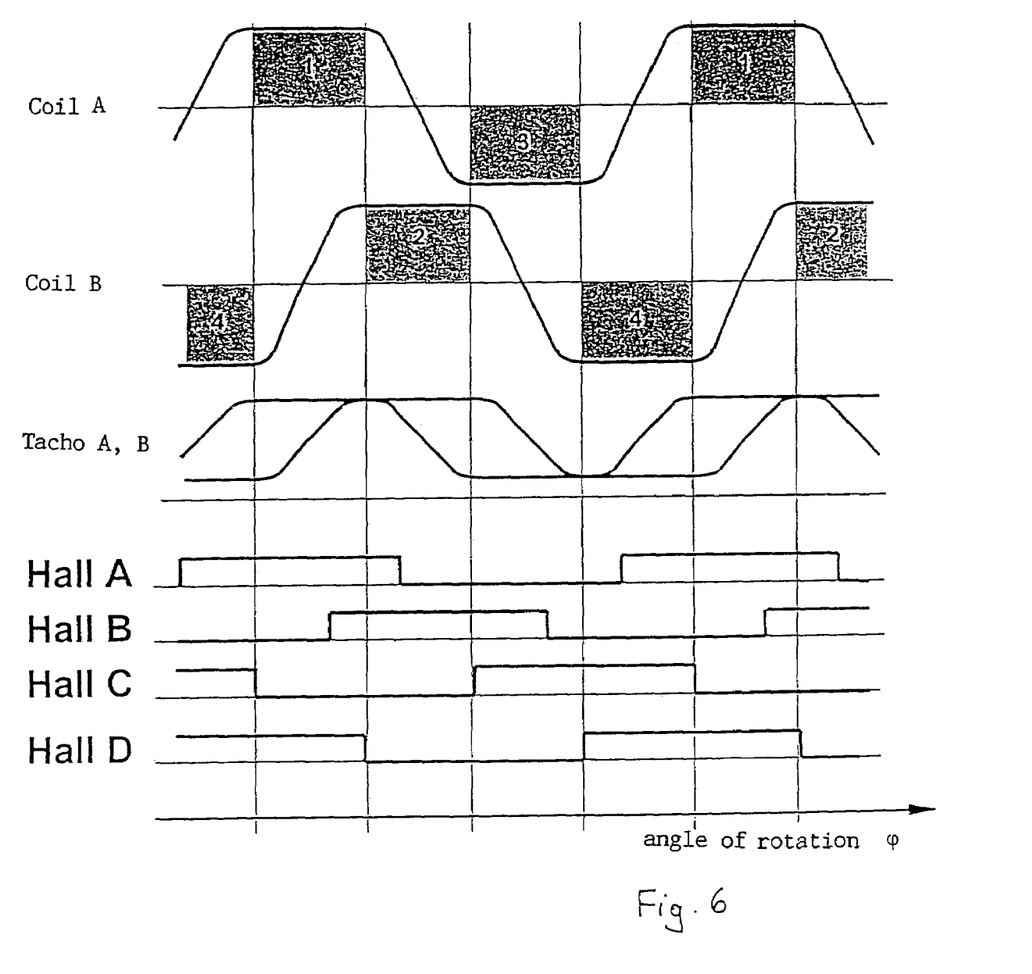
FIG. 6 a graph which illustrates measurement results which were obtained using the coil arrangement shown in FIG. 2 in a tachogenerator in accordance with the present invention.

FIG. 6 shows the rpm-dependent output signal of two coil pairs 40 connected in series which are indicated by Coil A or Coil B, as well as the voltage-displaced and superimposed output signals of the two coil pairs which are indicated as Tacho A, B. In FIG. 6, the coil signals are divided into four sections which are indicated by 1, 2, 3, 4, whereby each section corresponds to that part of the signal curve of Coil A or B in which the curve form is level and is thus ideally suited to interpret the amplitude. Since the signal waveform depends on the current angle of rotation, the invention provides for the rotational position of the rotor shaft 16 to be determined in order to ascertain which section of the signal curve should be used in interpreting the amplitude.

To determine the rotational position, the Hall sensors HA, HB, HC and HD, 62 illustrated in FIG. 3 are provided. The Hall sensors HC and HD are phase-shifted by 90 degrees (electric). Depending on the output signal of these Hall sensors HC, HD, the valid signal waveform which is to be used in analyzing the amplitude is determined. Depending on the output signals of the Hall sensors 62, the analysis and control device 78 triggers the analogue/digital transducer 74 in order for it to process the output signal of Coil A or Coil B or of the coil pair. The valid signal sections for the analysis of the amplitude of the coil signals are as follows:

Section 1 (Coil A)=HD∩HC

Section 2 (Coil B)=HD∩HC

Section 3 (Coil A)=HC∩HD

Section 4 (Coil B)=HC∩HD.

In practice, the Hall sensors are also used to determine the rotational position of the rotor shaft 16 to control the output transistors of the winding phases. For this purpose, the Hall sensors HA, HB and HC are arranged phase-shifted by 120 degrees (electric), whereby the following conditions for the control of the phases U, V, W of the DC motor result:

Phase U=HA∩HB

Phase V=HB∩HC

Phase W=HC∩HA

The person skilled in the art will be aware that any other type of rotational position sensor can be used to determine the angle of rotation of the rotor shaft 16 in order to ascertain the suitable sections of the coil signal for the analysis of the signal amplitudes and thus the speed of the rotor shaft 16.

In the preferred embodiment of the invention, the coils 40 are staggered in relation to the pole sections 64, 66 of the magnetic ring 36 in such a way that there is a signal shift of 90° (electric) between the signals A and B induced in the coil pairs. This goes to create overlapping level sections in the signal waveform, as shown in the superimposed signal Tacho A, B, which, depending on the rotational position of the rotor shaft 16, can be interpreted in such a way that the amplitude is always registered in the level area of the coil signal. As mentioned above, the rotational position can be determined using optical, magnetic, inductive or any other suitable sensors.

In the tachogenerator presented in the invention, a simple solution in terms of design and construction has been found to generate an rpm-dependent signal with a higher output amplitude which is very resistant to interference and which can also operate reliably in the extreme conditions found in the automobile segment. Only the coils, voltage dividers 70, 72 of the circuit arrangement and the interference filter 76 have to be provided in the vicinity of the DC motor which can all be made of non-sensitive, passive elements. Sensitive electronic components are not necessary and can be provided outside the DC motor. Raising the signal makes it possible to use simple standard components for the digital/analogue transducer, whereby the use of wound coils having a sufficient number of turns will ensure a sufficiently high signal amplitude.

The characteristics revealed in the above description, the figures and the claims could be important in realizing the invention in its various embodiments individually or in any combination whatsoever.

The invention claimed is:

1. A device to generate an rpm-dependent signal for a three-phase electric motor having
   a plurality of magnet elements (64, 66) of alternating polarity which are arranged and distributed around the circumference of a shaft (16), and a plurality of coils (40), parallel to the axis, which are arranged on a supporting member (38) at an axial distance to the magnet elements (64, 66), whereby the magnet elements (64, 66) and the coils (40) are arranged relative to each other spatially and can be rotated in relation to each other with the rotation of the shaft (16) in order to induce an rpm-dependent signal in the coils (40), and with a circuit arrangement (70, 72) which receives the signals induced in the coils (40) and superimposes a DC voltage on the signals in order to generate voltage-displaced signals, an analysis and control device (78) to analyze the amplitude of the voltage-displaced, rpm-dependent signals, and a rotational position sensor (62) which registers the rotational position of the shaft (16), whereby the analysis and control device (78), depending on the output signals of the rotational position sensor, decides which half-wave of the rpm-dependent signal of which coil (40) is to be analyzed to determine the speed, whereby the rotational position sensor includes four Hall sensors (HA, HB, HC, HD), whereby two (HD, HC) of the Hall sensors are arranged phase-shifted by 90° electric in order to generate a determining signal in respect of the half-wave to be analyzed, and three (HA, HB, HC) of the Hall sensors are arranged phase-shifted by 120° electric in order to determine the rotational position of the shaft (16).

2. A device according to claim 1, wherein the coils (40) are formed as flat trapezoid coils and arranged alongside each other on a surface of the supporting member (38) and each Hall sensor (62) is arranged within one of the flat trapezoid coils.

3. A device according to claim 1, wherein a DC voltage supply ($V_{cc}$), which supplies a positive DC voltage in order to raise the rpm-dependent signals to a positive potential.

4. A device according to claim 1, wherein the circuit arrangement features a voltage divider (70, 72) which is connected at one contact point to the coil (40) and to the. DC voltage ($V_{cc}$) at another contact point, whereby the voltage-displaced signals are produced at a center tap of the voltage divider (70, 72).

5. A device according to claim 4, wherein the voltage divider features two resistors (70, 72) connected in series whose connecting points form the center tap of the voltage divider, and the coils (40) are connected to a reference potential.

6. A device according to claim 5, wherein an interference filter (76) is connected between the center tap and the reference potential.

7. A device according to claim 1, wherein an analogue/digital transducer (74) which analyzes the voltage-displaced signals.

8. A device according to claim 1, wherein at least two, particularly four or six coils (40), are provided which are arranged and equally distributed around the circumference of the shaft (16).

9. A device according to claim 8, wherein an even number of coils (40) is provided, whereby two coils (40) are connected in series and also connected to a signal displacement circuit (70, 72).

10. A device according to claim 1, wherein the coils (40) are wound coils.

11. A device according to claim 10, wherein the coils (40) are flat coils.

12. A device according to claim 10, wherein the coils (40) are wound from a thin flat wire set on edge.

13. A device according to claim 10, wherein the coils (40) are wound from a thin wire, coated with an insulating material, particularly an enameled wire, whereby the insulating material is removed from the winding ends in order to connect the coils (40).

14. A device according to claim 10, wherein the coils (40) have at least 150 turns.

15. A device according to claim 10, wherein the coils (40) are wound onto a coil core.

16. A device according to claim 1, wherein a magnetic coil flux guide element (42) is allocated to the coils (40).

17. A device according to claim 1, wherein the supporting member (38) features a rigid and/or flexible PCB.

18. A device according to claim 1, wherein the magnet elements (64, 66) take the form of a magnetic ring (36) which has alternatively polarized sections.

19. A device according to claim 18, wherein the magnetic ring (36) has four to twelve, in particular six, alternatively polarized sections (64, 66).

20. A device according to claim 18, wherein the coils (40) take the form of flat coils whose circumferential contour is adapted to the shape of the magnetic ring sections (64, 66).

21. A device according to claim 20, wherein the coils (40) each have two radial sections which extend radially to the shaft (16) as well as two circumferential sections which connect the radial sections at their inner and outer ends.

22. A device according to claim 1, wherein the coils (40) are attached to a surface of the supporting member (38) which faces the magnet elements.

23. A device according to claim 22, wherein that on the side of the supporting member (38) lying opposite the coils (40), a coil flux guide element (42) allocated to each of the coils (40) is provided.

24. A device according to claim 1, wherein the rotational position sensor is an optical, inductive or magnetic sensor.

25. An electronically commutated DC motor with a device according to claim 1.

26. A method to generate an rpm-dependent signal in a three-phase electric motor (10) which features a plurality of magnet elements (64, 66) of alternating polarity which are arranged and distributed around the circumference of a shaft (16), as well as a plurality of coils (40) parallel to the axis which are arranged on a supporting member (38) at an axial distance to the magnet elements (64, 66), whereby the magnet elements (64, 66) and the coils (40) are arranged spatially relative to each other and can be rotated in relation to each other with the rotation of the shaft (16), in which:

rpm-dependent signals are induced in the coils (40) through the rotation of the shaft (16), a DC voltage (½ $V_{cc}$) is superimposed on the rpm-dependent signals in order to generate voltage-displaced signals, the rotational position of the shaft (16) is registered by means of a rotational position sensor, and the amplitude of the voltage-displaced, rpm-dependent signals is analyzed, whereby, depending on the output signals of the rotational position sensor, a decision is made as to which half-wave of the voltage-displaced, rpm-dependent signals of which coil (40) is to be analyzed to determine the speed, whereby the rotational position sensor includes four Hall sensors (HA, HB, HC, HD), whereby two (HD, HC) of the Hall sensors are arranged phase-shifted by 90° electric in order to generate a determining signal in respect of the half-wave to be analyzed, and three (HA, HB, HC) of the Hall sensors are arranged phase-shifted by 120° electric in order to determine the rotational position of the shaft (16).

27. A method according to claim 26, wherein the rpm-dependent signals are a regular DC voltage.

28. A method according to claim 26, wherein the DC voltage is positive.

29. A device to generate an rpm-dependent signal for a three-phase electric motor having a plurality of magnet elements (64, 66) of alternating polarity with care arranged and distributed around the circumference of a shaft (16), and a plurality of coils (40), parallel to the axis, which are arranged on a supporting member (38) at an axial distance to the magnet elements (64, 66), whereby the magnet elements (64, 66) and the coils (40) are arranged relative to each other spatially and can be rotated in relation to each other with the rotation of the shaft (16) in order to induce an rpm-dependent signal in the coil (40), and with a circuit arrangement (70, 72) which receives the signals induced in the coils (40) and superimposes a DC voltage on the signals in order to generate voltage-displaced signals, an analysis and control device (78) to analyze the amplitude of the voltage displaced, rpm-dependent signals, and a rotational position sensor (62) which registers the rotational position of the shaft (16), whereby the analysis and control device (78), depending on the output signals of the rotational position sensor, decides which half-wave of the rpm-dependent signal of which coil (40) is to be analyzed to determine the speed, wherein the coils (40) are formed as flat trapezoid coils and arranged alongside each other on a surface of the supporting members (38) and each Hall sensor (62) is arranged within one of the flat trapezoid coils.

* * * * *